United States Patent
Kumar

(10) Patent No.: US 11,228,597 B2
(45) Date of Patent: Jan. 18, 2022

(54) PROVIDING CONTROL TO TENANTS OVER USER ACCESS OF CONTENT HOSTED IN CLOUD INFRASTRUCTURES

(71) Applicant: Nutanix, Inc., San Jose, CA (US)

(72) Inventor: Ritesh Kumar, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 430 days.

(21) Appl. No.: 16/273,178

(22) Filed: Feb. 12, 2019

(65) Prior Publication Data

US 2020/0259836 A1    Aug. 13, 2020

(51) Int. Cl.
*H04L 29/00* (2006.01)
*H04L 29/06* (2006.01)
*G06F 21/62* (2013.01)

(52) U.S. Cl.
CPC ........ *H04L 63/102* (2013.01); *G06F 21/6209* (2013.01); *H04L 63/20* (2013.01); *G06F 2221/2101* (2013.01); *G06F 2221/2107* (2013.01)

(58) Field of Classification Search
CPC ..... H04L 63/20; H04L 63/107; H04L 63/102; H04L 63/0435; G06F 21/31; G06F 21/6209; G06F 2221/2101; G06F 2221/2107
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,621,605 B2 * | 12/2013 | Burugula | G06F 21/554 726/22 |
| 8,769,622 B2 | 7/2014 | Chang et al. | |

(Continued)

FOREIGN PATENT DOCUMENTS

| | | |
|---|---|---|
| CN | 104378386 A | 2/2015 |
| CN | 103327002 B | 4/2016 |
| CN | 105025012 B | 12/2017 |

OTHER PUBLICATIONS

K.Kartheek et al., / (IJCSIT) International Journal of Computer Science and Information Technologies, vol. 5 (6), 2014, 6942-6945 (Year: 2014).*

(Continued)

*Primary Examiner* — Don G Zhao
(74) *Attorney, Agent, or Firm* — Iphorizons PLLC; Narendra Reddy Thappeta

(57) ABSTRACT

An aspect of the present disclosure provides control to tenants over user access of content hosted in cloud infrastructures. In one embodiment, a host node (of a cloud infrastructure) accepts a content item in encrypted form and an associated set of attributes from a tenant, and hosts the content item in encrypted form. Upon receiving a request from a user to access the content item, the node determines a set of attributes associated with the request, the determined set including at least one attribute originating at another host (Continued)

node of the cloud infrastructure. If the determined set of attributes matches the associated set of attributes, the node decrypts the content item to generate the content item in decrypted form and then provides access to the content item in decrypted form to the user as a response to the request.

20 Claims, 8 Drawing Sheets

(56) References Cited

U.S. PATENT DOCUMENTS

| | | | |
|---|---|---|---|
| 8,850,130 | B1 | 9/2014 | Aron et al. |
| 9,495,545 | B2 | 11/2016 | Schaad |
| 9,710,664 | B2 | 7/2017 | Sathyadevan et al. |
| 9,772,866 | B1 | 9/2017 | Aron et al. |
| 9,774,586 | B1 | 9/2017 | Roche et al. |
| 10,528,705 | B2 * | 1/2020 | Farrugia ............... G06F 21/10 |
| 10,924,496 | B1 * | 2/2021 | Gu ....................... H04W 12/63 |
| 11,030,285 | B2 * | 6/2021 | Crawford ............. H05K 7/2079 |
| 2007/0265975 | A1 * | 11/2007 | Farrugia ............... G06F 21/10 705/59 |
| 2009/0094676 | A1 * | 4/2009 | Burugula ............. G06F 21/554 726/2 |
| 2010/0293049 | A1 * | 11/2010 | Maher ................. G06Q 30/0273 705/14.46 |
| 2012/0166818 | A1 * | 6/2012 | Orsini .................. H04L 9/3231 713/193 |
| 2013/0304917 | A1 * | 11/2013 | Mittal .................. H04L 63/101 709/225 |
| 2013/0332987 | A1 * | 12/2013 | Tenneti ................ H04L 63/10 726/1 |
| 2014/0053227 | A1 * | 2/2014 | Ruppin ................. H04L 67/06 726/1 |
| 2014/0208418 | A1 * | 7/2014 | Libin ................... G06F 21/6209 726/19 |
| 2014/0214670 | A1 * | 7/2014 | McKenna ........... G06Q 20/4014 705/44 |
| 2015/0033013 | A1 * | 1/2015 | Jalili .................... H04L 9/14 713/165 |
| 2017/0041296 | A1 * | 2/2017 | Ford .................... G06F 16/951 |
| 2017/0060936 | A1 * | 3/2017 | Gammans ........... G06F 16/2358 |
| 2017/0085536 | A1 | 3/2017 | D'Souza et al. |
| 2017/0178124 | A1 * | 6/2017 | Havilio ............... G06Q 20/3674 |
| 2018/0189504 | A1 * | 7/2018 | Ghafourifar ......... G06F 21/6209 |
| 2018/0232526 | A1 * | 8/2018 | Reid .................... H04L 9/3271 |
| 2018/0253337 | A1 * | 9/2018 | Barsness ............. G06F 8/4436 |
| 2019/0036678 | A1 * | 1/2019 | Ahmed ................ H04L 9/302 |
| 2019/0190917 | A1 * | 6/2019 | Joe ...................... H04L 63/10 |
| 2019/0197246 | A1 * | 6/2019 | Viswanathan ...... G06F 16/9537 |
| 2019/0258813 | A1 * | 8/2019 | Lewis .................. G06F 21/6209 |
| 2019/0324879 | A1 * | 10/2019 | Abraham ............. G06F 21/57 |
| 2020/0125616 | A1 * | 4/2020 | Sun ..................... G06F 16/9537 |
| 2020/0213318 | A1 * | 7/2020 | Ojha .................... H04L 63/0272 |
| 2021/0144517 | A1 * | 5/2021 | Bernat ................. H04L 9/3213 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org first publication date unknown); pp. all.

Poitras, Steven. "The Nutanix Bible" (Jan. 11, 2014), from http://stevenpoitras.com/the-nutanix-bible/ (Publication date based on indicated capture date by Archive.org first publication date unknown); pp. all.

Poitras, Steven. "The Nutanix Bible" (Jun. 20, 2014), from http://stevenpoitras.com/the-nutanix-bible/ (Publication date based on indicated capture date by Archive.org first publication date unknown); pp. all.

Poitras, Steven. "The Nutanix Bible" (Jan. 7, 2015), from http://stevenpoitras.com/the-nutanix-bible/ (Publication date based on indicated capture date by Archive.org first publication date unknown); pp. all.

Poitras, Steven. "The Nutanix Bible" (Jun. 9, 2015), from http://stevenpoitras.com/the-nutanix-bible/ (Publication date based on indicated capture date by Archive.org first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Ignacio Cano, et al., Curator: Self-Managing Storage for Enterprise Clusters, https://www.usenix.org/conference/nsdi17, Mar. 27-29, 2017, 16 pages, Boston, MA, Nutanix Inc.

CH Gowthami, G G. Sreeja, B. Rajitha, Control Cloud Data Access Privilege Using Attribute Based Encryption, International Journal of Computer Science and Information Technology & Security, date Mar.-Apr. 2016, pp. 217-223, vol. 6, No. 2, ISSN: 2249-9555.

Chaudhari Swapnil H., Mandre B.R., Secure Data Retrieval based on Attribute-based Encryption in Cloud, International Journal of Computer Applications (0975-8887), date Jan. 2016, pp. 31-35, vol. 134—No. 13.

* cited by examiner

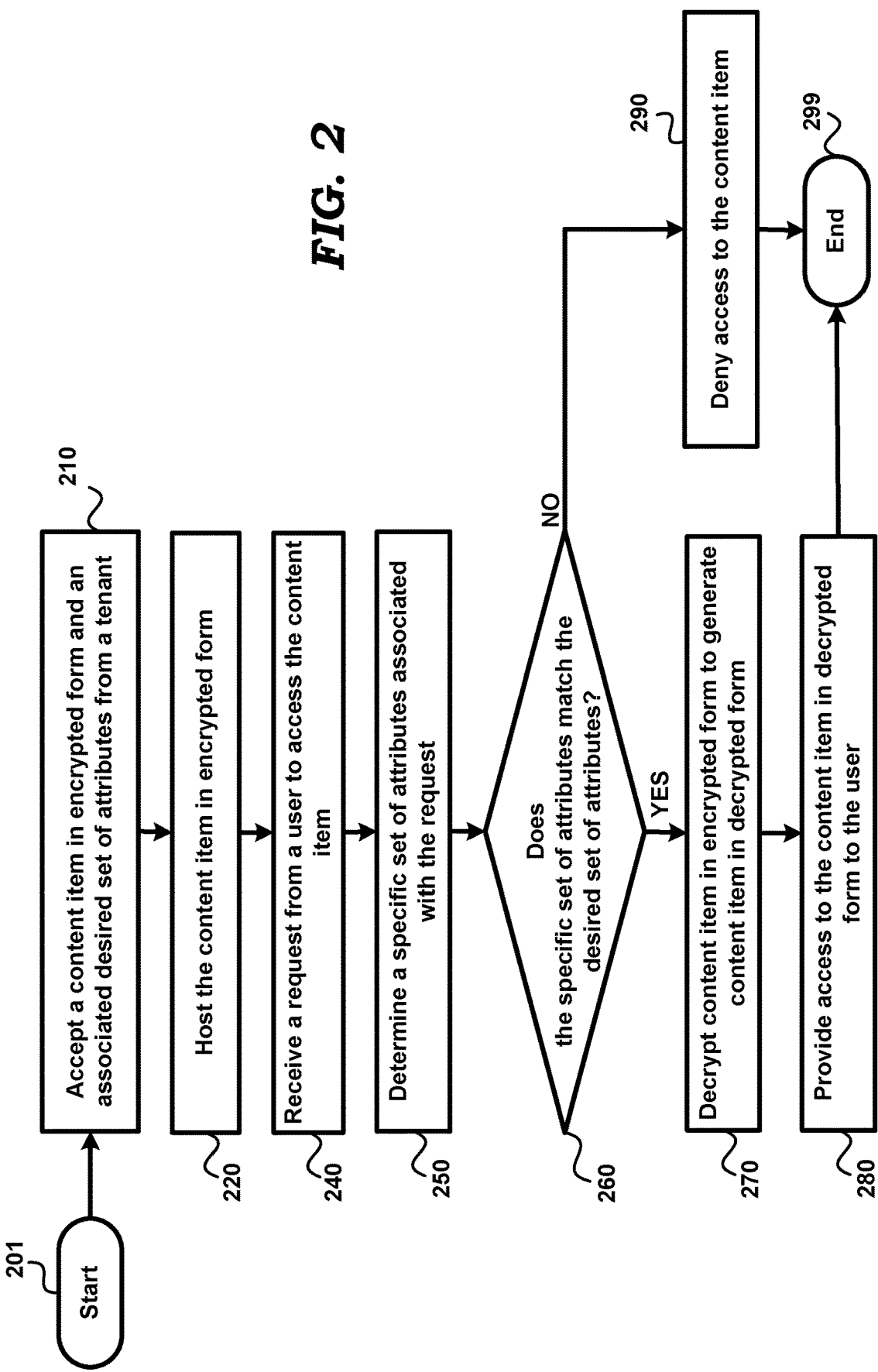

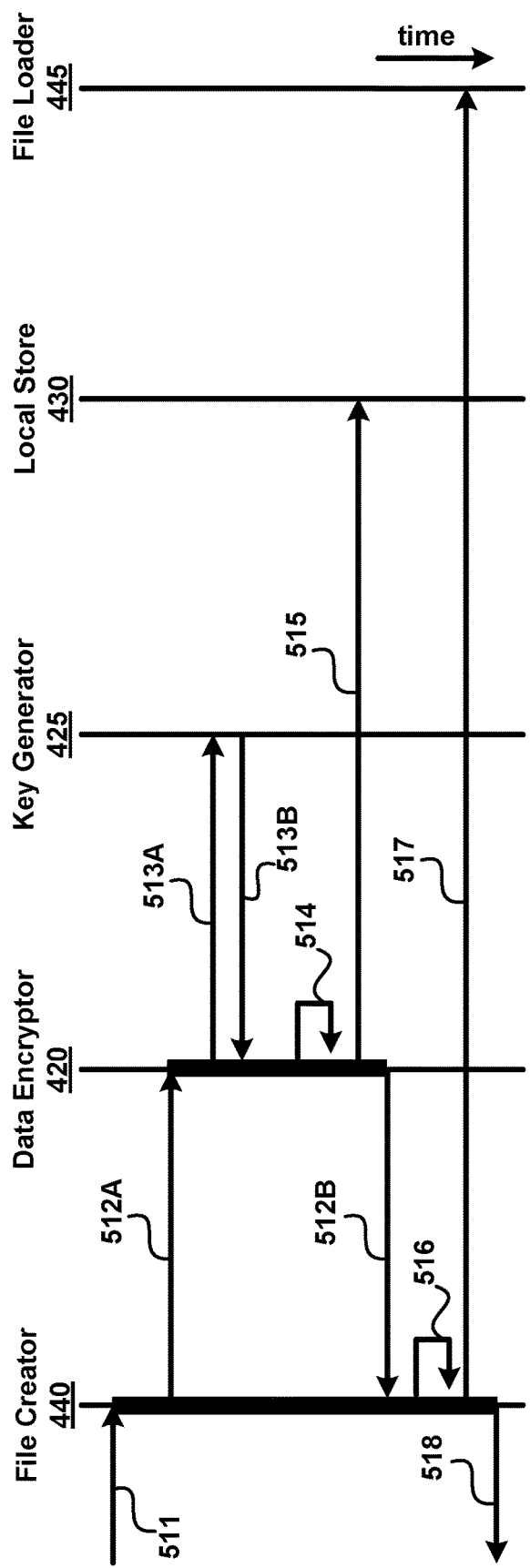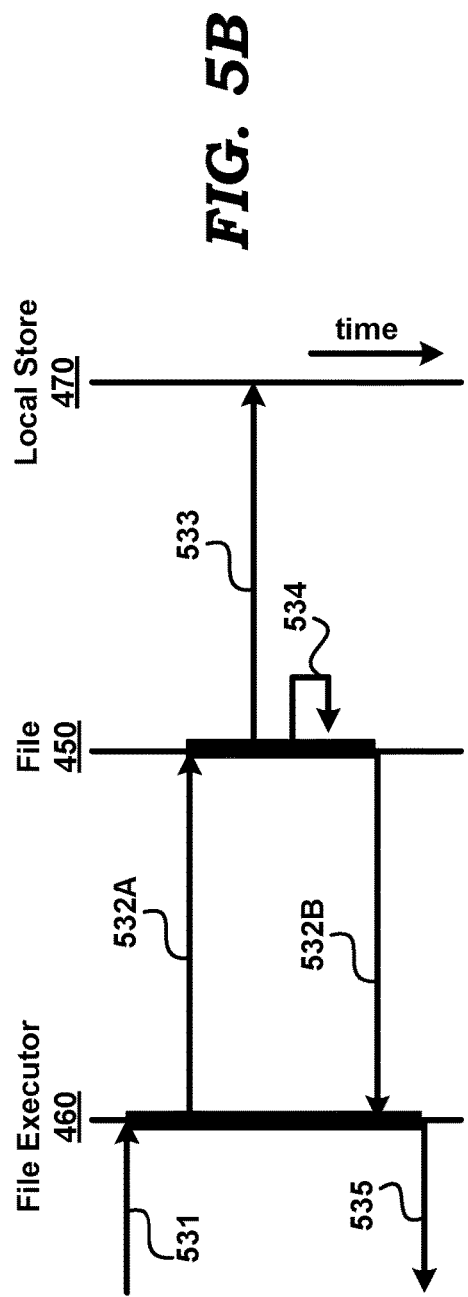

US 11,228,597 B2

PROVIDING CONTROL TO TENANTS OVER USER ACCESS OF CONTENT HOSTED IN CLOUD INFRASTRUCTURES

BACKGROUND OF THE DISCLOSURE

Technical Field

The present disclosure relates to cloud computing, and more specifically to providing control to tenants over user access of content hosted in cloud infrastructures.

Related Art

Cloud infrastructure refers to a collection of processing nodes, connectivity infrastructure, data storages, etc., which are engineered to together provide a virtual computing infrastructure for various customers, with the scale of such computing infrastructure being specified often on demand. Many vendors such as Amazon, Google, Microsoft, etc., provide corresponding cloud infrastructures.

Tenants (or customers) refer to organizations who host desired applications/data services and/or data (content) on one or more systems/nodes of such cloud infrastructures. In the disclosure herein, the term "content" refers to the set of applications/data services and data hosted by a tenant, while the term "content item" refers to a single application/data service or specific portion of data hosted by the tenant.

Users seek to access content items from external networks (e.g., world-wide-web). However, tenants often wish to control access of content items to specific users. Aspects of the present disclosure are directed to providing control to tenants over user access of content hosted in cloud infrastructures.

BRIEF DESCRIPTION OF THE DRAWINGS

Example embodiments of the present disclosure will be described with reference to the accompanying drawings briefly described below.

FIG. 2 is a flow chart illustrating the manner in which control to tenants over user access of content hosted in cloud infrastructures is enhanced according to an aspect of the present disclosure.

FIG. 5A is a sequence diagram illustrating the interaction of various components to support a tenant hosting a content item in one embodiment.

FIG. 5B is a sequence diagram illustrating the interaction of various components to support a user access of a hosted content item in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1A:
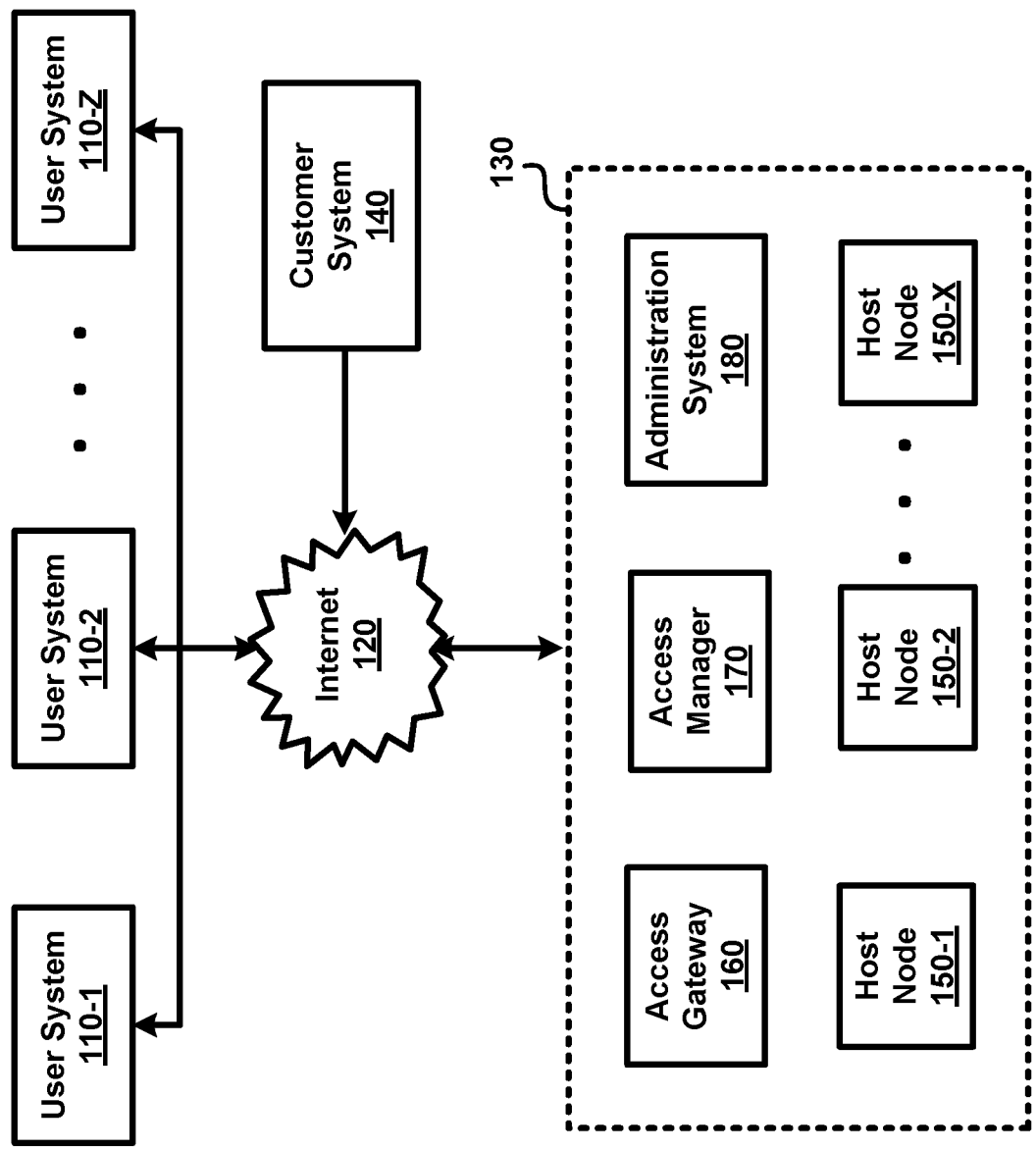
FIG. 1A is a block diagram illustrating an example environment (computing system) in which several aspects of the present invention can be implemented.

An aspect of the present disclosure provides control to tenants over user access of content hosted in cloud infrastructures. In one embodiment, a host node (of a cloud infrastructure) accepts a content item in encrypted form and an associated set of attributes from a tenant, and hosts the content item in encrypted form. Upon receiving a request from a user to access the content item, the node determines a set of attributes associated with the request, the determined set including at least one attribute originating at another host node of the cloud infrastructure. If the determined set of attributes matches the associated set of attributes, the node decrypts the content item to generate the content item in decrypted form and then provides access to the content item in decrypted form to the user as a response to the request.

By choosing any desired set of attributes and controlling the decryption of the content item, a tenant hosting the content item is provided control over user access. Such control is provided in addition to access policies enforced by the cloud infrastructures in embodiments described below.

In one embodiment, the node performs the determining of the specific set of attributes, the decrypting of the content item and the providing of the content item in decrypted form automatically, without requiring human intervention between receiving of the request from the user and providing of the content item.

According to another aspect of the present disclosure, the tenant also provides an access criteria specifying users permitted to access the content item. Upon receiving the request noted above, the node also checks whether the user satisfies the access criteria. The node performs the above noted actions of decrypting and providing if the user is determined to satisfy the access criteria and the specific set of attributes match the desired set of attributes.

According to one more aspect of the present disclosure, the cloud infrastructure (hosting the content item noted above) includes an access manager controlling access of content items hosted in the cloud infrastructure. The above noted at least one attribute associated with the request originated at the access manager, with the host node receiving the at least one attribute from the access manager.

According to yet another aspect of the present disclosure, the tenant provides the desired set of attributes as dependent attributes of a decryption key according to attribute based encryption (ABE). The node performs the decrypting of content item using the decryption key according to ABE, wherein the match of the specific set of attributes with the desired set of attributes is enforced by the ABE as part of decrypting.

According to an aspect of the present disclosure, the node generates an audit log specifying the details of access of the content item. The node then encrypts the audit log using an encryption key according to the ABE to create an audit log in encrypted form and stores the audit log in the encrypted form to be thereafter accessible only by the tenant.

According to another aspect of the present disclosure, the above noted content item in encrypted form, access criteria, decryption key, encryption key along with an access checker module performing the checking whether the user satisfies the access criteria, and an audit module performing the generating, encrypting and storing of the audit log are together provided in a single file by the tenant. In one embodiment, the single file is a Java Archive (JAR) file.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1A is a block diagram illustrating an example environment (computing system) in which several aspects of the present invention can be implemented. The block diagram is shown containing user systems 110-1 through 110-Z (Z representing any integer), Internet 120, cloud infrastructure 130 and customer system 140. Cloud infrastructure 130 in turn is shown containing various nodes including host nodes 150-1 through 150-X (X representing any integer), access gateway 160, access manager 170 and administration system 180. The user systems and host nodes are individually or collectively referred to by 110 and 150 respectively, as will be clear from the context.

Merely for illustration, only representative number/type of systems are shown in FIG. 1A. Many environments often contain many more systems, both in number and type, depending on the purpose for which the environment is designed. Each block of FIG. 1A is described below in further detail.

Cloud infrastructure 130 is a collection of nodes (150, 160, 170 and 180), connectivity infrastructure, etc., which are engineered to together provide a virtual computing infrastructure (typically computing and storage) for various customers/tenants, with the scale of such virtual infrastructure being specified often on demand. Cloud infrastructure 130 may be one of Amazon Web Services (AWS) Cloud available from Amazon.com, Inc., Google Cloud Platform (GCP) available from Google LLC, etc., or a private cloud such as an On-Premises cloud owned by the customers/tenants.

All the nodes (e.g. 150, 160, 170 and 180) of cloud infrastructure 130 are assumed to be connected via an intranet (not shown in the Figure). Internet 120 extends the connectivity of these nodes (and other systems of the cloud) with external systems such as user systems 110 and customer system 140. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet. When the packet contains content such as port numbers, which specifies a target application, the packet may be said to be directed to such application as well.

Some of host nodes 150 may be implemented as corresponding data stores. A data store represents a non-volatile (persistent) storage facilitating storage and retrieval of enterprise by applications executing in the other systems/nodes of cloud infrastructure 130. A data store may be implemented as a corresponding database server using relational database technologies and accordingly provide storage and retrieval of data using structured queries such as SQL (Structured Query Language). Alternatively, a data store may be implemented as a corresponding file server providing storage and retrieval of data in the form of files organized as one or more directories, as is well known in the relevant arts.

Some of host nodes 150 may be implemented as corresponding server systems. A server system represents a server, such as a web/application server, hosting and executing applications/data services capable of performing tasks requested by users using user system 110. Though the embodiments below are described with respect to primarily "applications" for conciseness, it may be appreciated that the same aspects of the present disclosure are applicable to data services hosted on one or more host nodes 150 as well.

A server system receives a user request from a user system and performs the tasks requested in the user request. The server system may use data stored internally (for example, in a non-volatile storage/hard disk within the server system), external data (e.g., maintained in a data store) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

Access manager 170 represents a server, such as a web/application server that facilitates customers/tenants to configure desired user access of applications hosted in host nodes 150. In one embodiment, the desired user access is specified in the form of a combination of access policies implemented by access manger 170. The access policies can include requirements such as authentication of the user according to a specific approach (e.g. based on user credentials such as user identifier and password), enforcement of exclusions/inclusions (defining access privileges) of applications (content items in general) the user can access, etc.

It should be appreciated that access manager 170 may have in possession various attributes of users at least as required for qualifying (permitting or denying) access to various content items (applications, data, etc.) hosted in cloud infrastructure 130. Thus, when a user is authenticated, some of such attributes may be examined to determine the specific sets of content items of cloud infrastructure 130 the user is permitted to access and not permitted to access. An access policy for a content item is said to be satisfied when the user is permitted to access the content item and not satisfied if the user is not to be permitted access.

Access gateway 160 represents a networking device such as a bridge, router, etc. that implements the various access policies specified by the configuration of access manager 170. Broadly, access gateway 160 is designed to intercept requests received from external systems (such as user systems 110 and customer system 140) over Internet 120, and forwards the requests to target applications (hosted in cloud infrastructure 130) only upon the requests satisfying any desired access policies.

It should be appreciated that cloud infrastructure 130 may include many access gateways (potentially of the order of several hundreds), with such access gateways being served by multiple access managers. In addition, each access gateway may serve only a subset of applications (e.g. belonging to a single tenant) hosted in host nodes 150 of cloud infrastructure 130.

Administration system 180 represents a server, such as a web/application server that facilitates customers/tenants to perform administration services in cloud infrastructure 130. Examples of such administration services includes but are not limited to provisioning a new host node, hosting desired applications and data in a host node, upgrading/downgrading the application implementations, etc. Administration system 180 may provide specific user interfaces (e.g., web pages) that enable the customers/tenants to perform the various administration services.

Each of user systems 110 represents a system such as a personal computer, workstation, mobile device, computing tablet etc., used by users to generate (user) requests directed to applications executing in cloud infrastructure 130. The user requests may be generated using appropriate user interfaces (e.g., web pages provided by an application executing in a node, a native user interface provided by a portion of an application downloaded from a node, etc.).

In general, a user system requests an application for performing desired tasks and receives the corresponding responses (e.g., web pages) containing the results of performance of the requested tasks. The web pages/responses may then be presented to the user by user applications such as the browser. Each user request is sent in the form of an IP packet directed to the desired system or application, with the IP packet including data identifying the desired tasks in the payload portion.

Customer system 140 represents a system such as a personal computer, workstation, mobile device, computing tablet etc., used by a customer/tenant to generate (customer) requests directed to the various systems in cloud infrastructure 130. The customer requests may be generated using appropriate user interfaces. The customer requests are sent for performing desired tasks, with the corresponding responses (e.g., web pages) containing the results of performance of the requested tasks.

In one embodiment, each customer/tenant is provided with a corresponding virtual computing infrastructure (referred to as a "cloud") hosted on host nodes 150 of cloud infrastructure 130. Such virtual cloud infrastructure is typically provided in the form of one or more virtual machines (VMs) executing in host nodes 150 as is well known in the arts. Each tenant may host desired applications/data services (content) on their cloud(s), which are capable of processing user requests received from user systems 110.

The manner in which a tenant may host desired content items (applications/data services or data portions) in their cloud and the manner in which such hosted content items are later accessed by users using user systems 110 is described below with examples.

3. Hosting and Accessing Content Items

Figure 1B:
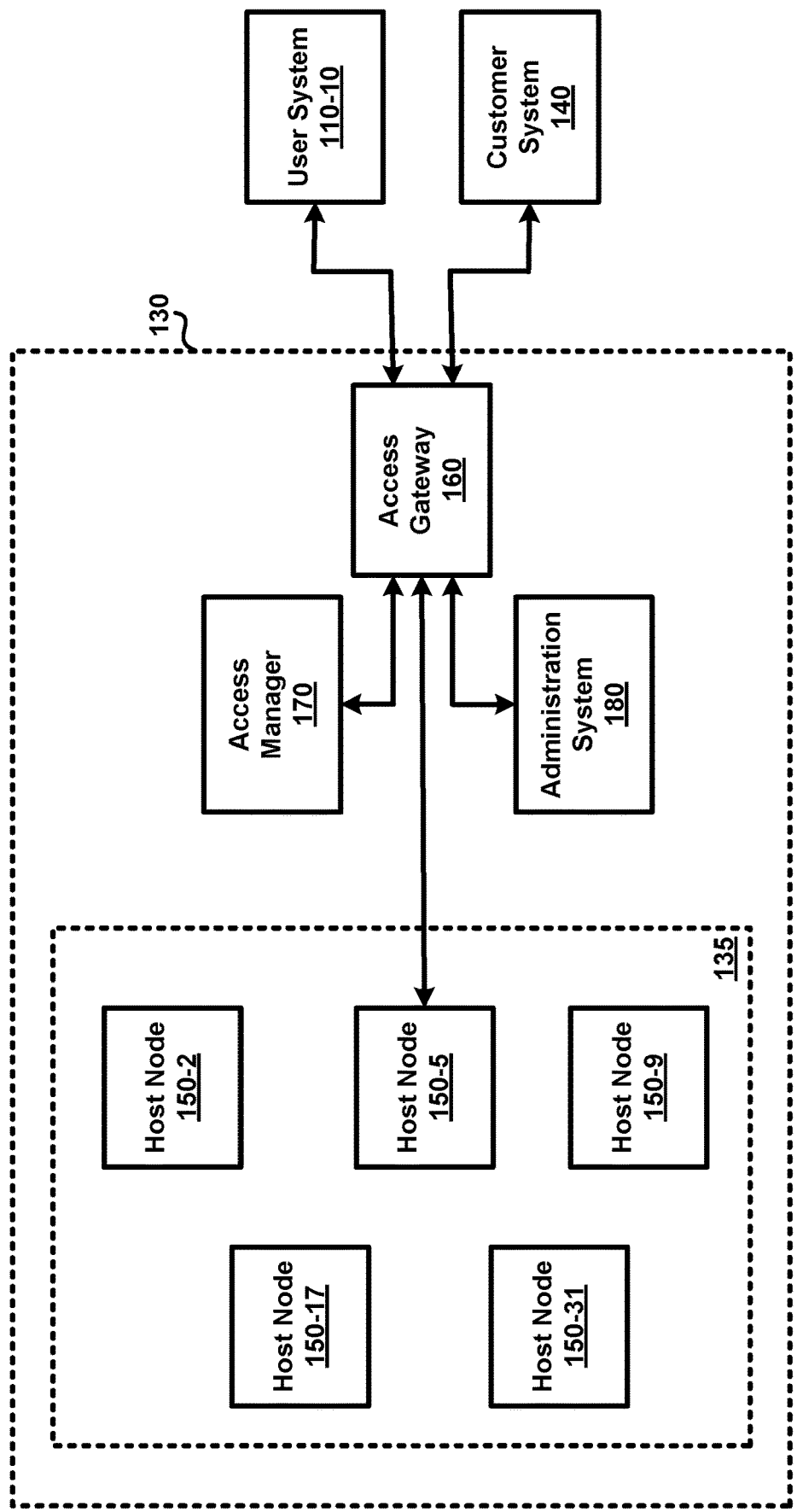
FIG. 1B is a block diagram illustrating the manner in which content items are hosted and later accessed by users in one embodiment.

FIG. 1B is a block diagram illustrating the manner in which content items are hosted and later accessed by users in one embodiment. For illustration, it is assumed that the content items are hosted in host node 150-5, though the features of the present disclosure can be implemented in any of host nodes 150 of cloud infrastructure 130, as will be apparent to one skilled in the relevant arts by reading the disclosure herein.

A tenant using customer system 140 sends customer requests for invoking one or more administration services provided by administration system 180. The requests are intercepted by access gateway 160 and forwarded to administration system 180 if the tenant is allowed to perform such administration services.

A tenant first uses the administration services to provisioning (creating) a new cloud containing a desired number of nodes. Cloud 135 represents such a cloud provisioned by a tenant in cloud infrastructure 130. Cloud 135 is shown containing host nodes 150-2, 150-5, 150-9, 150-17 and 150-31. The tenant then uses (by invoking one or more times) the administration services to perform tasks associated with their cloud 135, such as, hosting desired content items (applications and data) on the nodes in their cloud 135, expanding/shrinking the size of cloud 135 (by adding or removing host nodes), replacing host nodes of the cloud 135 (i.e., migrating application/data to another host node), taking backups of host nodes of the cloud 135, restoring host nodes from backups, etc.

In one embodiment, a tenant using customer system 140 also sends customer requests specifying the access policies to be used by access manager 170 when providing user access to the content items hosted by the tenant. Again, such customer requests are intercepted by access gateway 160 and forwarded to access manager 170 upon satisfying of desired policies configured for tenants/customers of cloud infrastructure 130. The tenant may specify the desired access policies using user interfaces (e.g. web pages) provided by access manager 170.

Thus, a tenant is facilitated to host desired content items in their cloud and also to specify the access policies for the hosted content items. The manner in which users using user systems 110 access the hosted content items is described in detail below.

Broadly, when a user request directed to a target content item (e.g. application executing in host nodes 150) is received from a user system 110, access gateway 160 intercepts the packet and examines whether the user is already authorized for the corresponding operation specified in the packet. If there is no prior user authorization, an authorization request is sent to access manager 170 to receive a corresponding authorization indicating the target content item and permissions granted to the corresponding user (assuming appropriate authentication). Access gateway 160 forwards the user request to the target content item/application only upon successful authorization (and possibly authentication) of the user by access manager 170.

When an authorization request is received from access gateway 160, access manger 170 may perform authentication of the user and send a result of authentication as a response to the authorization request. Access manager 170 may also indicate the specific permissions and potential privileges (e.g., read access, write access, administrative access, etc.) for each of the content items/applications the user is permitted to access in the response to the authorization request.

Thus, when a user request is received for accessing a content item hosted in cloud 135 (e.g. host node 150-5) from a user using user system 110-10, access gateway 160 intercepts the user request and sends an authorization request to access manager 170. Access manger 170 determines the access policies specified (as described above) by the tenant, and checks whether the user satisfies the determined access policies. Access manager 170 may perform any desired authentication of the user. Access manager 170 then sends a response to the authorization request to access gateway 160.

Upon successful authentication and/or authorization, access gateway 160 forwards the user request to the specific node (host node 150-5) for accessing the content item specified in the request. Subsequent user requests for accessing the content item from the same user may be forwarded by access gateway 160 based on the prior authorization (i.e., without sending any authorization requests to access manager 170). If the authentication and/or authorization fail, the user is denied access to the content item.

Thus, a tenant controls user access using access policies that are enforced by cloud infrastructure 130 before allowing access to the hosted content. As noted in the Background section, a tenant may desire control over user access in addition to those (access policies) provided by cloud infrastructure 130.

For example, an organization may desire to host their applications and data (content items) in a public cloud infrastructure such as Amazon Web Services (AWS) Cloud. However, the organization also may desire that such publicly hosted content items be available only to the employees (or other authorized users) of the organization. In such a scenario, the organization may desire to have additional security besides the access policies provided by the public cloud infrastructure, specifically, when the cloud infrastructure is not fully secure.

An aspect of the present disclosure provides enhanced control to tenants over user access of content hosted in cloud infrastructures. The manner in which such enhanced control to tenants is provided is described below with examples.

4. Providing Enhanced Control to Tenants Over User Access of Content

FIG. 2 is a flow chart illustrating the manner in which control to tenants over user access of content hosted in cloud infrastructures is enhanced according to an aspect of the present disclosure. The flowchart is described with respect to the systems of FIG. 1A, in particular host node 150-5, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, host node 150-5 accepts a content item in encrypted form and an associated desired set of attributes from a tenant. The content item and attributes may be received from (the tenant using) customer system 140. The term "encrypted form" implies that the original content item is in an encoded form not readily decipherable by users, and requires conversion back to the original content item (also referred to as "decrypted form") before being usable. The encoding of the content item is commonly performed using an encryption key, as is well known in the arts.

Attributes specify the features and/or characteristics of the users and/or the user requests. Examples of attributes are the geo-location (e.g. country) of the user/user request, the subscription the user has, the network from the access is being done, the time of day of access, etc. According to an aspect, the tenant provides the desired set of attributes as dependent attributes of a decryption key according to attribute based encryption (ABE), well known in the relevant arts.

In step 220, host node 150-5 hosts the content item in encrypted form. The term "host" here implies that the content item is ready to be served to the users using user systems 110. In other words, users are allowed to access the hosted content item as a response to corresponding user requests.

In step 240, host node 150-5 receives a request from a user to access the content item. The request may be received from a user using one of user systems 110.

In step 250, host node 150-5 determines a specific set of attributes associated with the request, with at least one attribute originating at another node of cloud infrastructure 130. Some of the attributes such as country may be determined by host node 150-5 by inspecting the headers of the packets forming the request. Some of the other attributes may be included in the payload of the request.

According to an aspect, the another node corresponds to access manager 170, which provides the at least one attribute associated with the user (or request). Accordingly, that attribute is said to originate at access manager 170, while the requests generally originate at user systems 110. In an embodiment, the attribute is provided to access gateway 160, which then adds the attribute to data packets forming the request, before forwarding to host node 150-5.

In step 260, host node 150-5 checks whether the specific set of attributes (associated with the request) match the desired set of attributes (associated with the content item). In an embodiment, a match is determined to be present if all the attributes in the specific set are contained in desired set and are the same as corresponding attributes in the desired set. However, alternative embodiments can be implemented requiring only a subset of the specific set of attributes be the same as corresponding attributes in the desired set, as will be apparent to a skilled practitioner by reading the disclosure provided herein. Control passes to step 270 if the specific set of attributes match the desired set of attributes and to step 290 otherwise.

In step 270, host node 150-5 decrypts content item in encrypted form to generate content item in decrypted form. The term "decrypt" entails converting the encoded/encrypted form of the content item to the original content item ("decrypted form"). The conversion of the encoded content item is commonly performed using a decryption key, which is a complement of the encryption key noted above, as is well known in the arts.

In one embodiment, the decrypting of content item is performed using a decryption key according to ABE, with the match of the specific set of attributes with the desired set of attributes (of step 260) being enforced by the ABE prior to the decrypting.

In step 280, host node 150-5 provides access to the content item in decrypted form to the user. In other words, the content item is made available to the user for further usage (such as viewing the content item, editing the content item, etc.) Control then passes to step 299, where the flowchart ends.

In step 290, host node 150-5 denies (the user) access to the content item when the specific set of attributes do not match the desired set of attributes. As such, the user is not allowed to further use the content item. Control then passes to step 299, where the flowchart ends.

Thus, a tenant is provided enhanced control over user access of content hosted in cloud infrastructure 130. In one embodiment, host node 150-5 performs the actions of 250, 260, 270 and 280 automatically, without requiring human intervention between receiving of the request from the user in step 210 and providing of the content item in step 280. The manner in which a tenant can be provided control according to the operation of FIG. 2 is described below with examples.

5. Illustrative Example

FIGS. 3A-3B, 4A-4B and 5A-5C together illustrate the manner in which control to tenants over user access of content hosted in cloud infrastructures is provided in one embodiment. The features of the present disclosure are described below with respect to FIG. 1B, where the tenant is an organization hosting its applications and data (content items) in cloud 135. Accordingly, administrators of the organization may wish to control access (of the hosted content items) by employees of the organization. Each of the Figures is described in detail below.

Figure 3A:
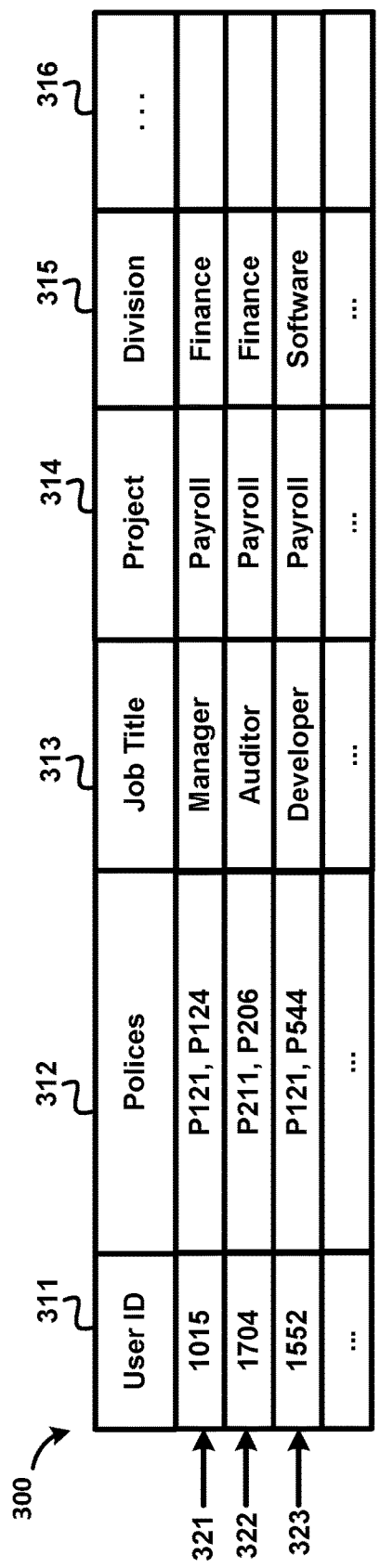
FIG. 3A depicts portions of policy data (containing attributes associated with users) used by access manager in a cloud infrastructure in one embodiment.

FIG. 3A depicts portions of policy data (containing attributes associated with users) used by access manager in a cloud infrastructure in one embodiment. The policy data may be specified by administrators of the organization. Though shown in the form of a table, policy data may be maintained according to other data formats (such as extensible markup language (XML), etc.) and/or using other data structures (such as lists, trees, etc.), as will be apparent to one skilled in the relevant arts by reading the disclosure herein.

Table 300 depicts a portion of the policy data used by access manager 170 in controlling access to content items hosted in cloud infrastructure 130. Specifically, column 311 specifies a unique identifier associated with a user, while column 312 specifies the various access policies (indicated by corresponding identifiers) to be enforced by access manager 170 for the user when accessing corresponding content items. Columns 313-315 respectively specify the values of the attributes "Job Title", "Project" and "Division" of the user. Column 316 represents other attributes that may be maintained for each user such as "Training", "Sensitivity", "Category", etc.

Each of rows of table 300 specifies the details of a corresponding user (e.g. employee of the organization). For example, row 321 specifies a user having the identifier "1015" has associated access policies P121 and P124 (that are to be enforced for the user), and the associated values of "Manager", "Payroll" and "Finance" corresponding to the attributes "Job Title", "Project" and "Division". Other rows such as 322 and 323 specify the details of other users accessing content items hosted in cloud infrastructure 130.

Thus, access manager 170 maintains attributes associated with users accessing the content items hosted in cloud infrastructure 130. It may be appreciated that the attributes are specific to the user/employee in the organization and accordingly may be viewed as "internal attributes" associated with the user/employee. The term "internal" implies that the attributes (or corresponding values) are not available outside of the cloud infrastructure 130 and cannot be received from the user (as part of the user request) using user systems 110.

According to an aspect of the present disclosure, access manager 170 sends the internal attributes associated with the user/user request to a host node (e.g. 150-5) hosting the content items sought to be accessed. The manner in which access manager 170 provides the internal attributes is described below with examples.

Figure 3B:
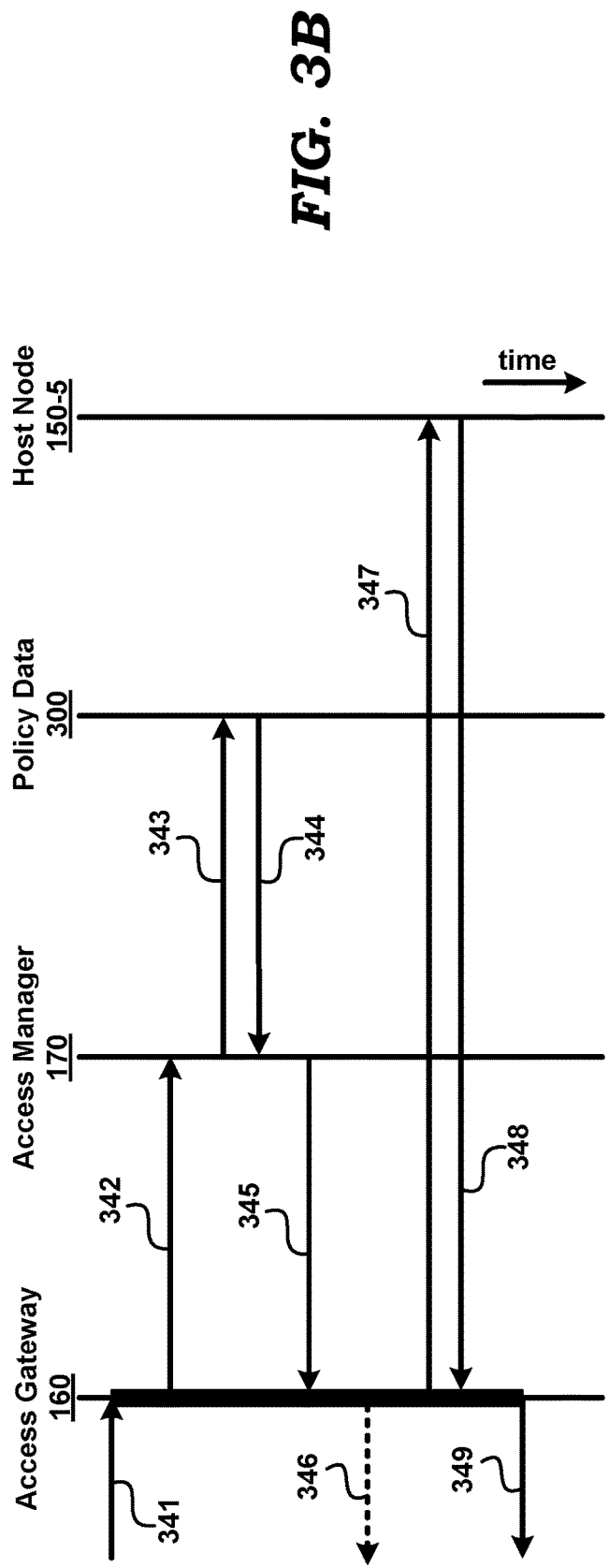
FIG. 3B is a sequence diagram illustrating the manner in which access manger provides attributes associated with users to a host node in one embodiment.

FIG. 3B is a sequence diagram illustrating the manner in which access manger provides attributes associated with users to a host node in one embodiment. At 341, access gateway 160 receives a user request (from a user using one of user systems 110) to access a hosted content item. Access gateway 160 then determines that the user does not have prior authorization to access the content item. At 342, access gateway 160 sends an authorization request to access manager 170. At 343, access manager 170 finds the policy data (e.g. table 300 of FIG. 3A) to be applied for the user based on the user identifier (assumed hereafter to be "1704"). At 344, access gateway 160 retrieves the policies and the attributes (shown in row 322) corresponding to the user.

At 345, access manager 170 determines whether the user is authorized to access the content item based on the policies (here, P211, P206) specified in the policy data. At 346, access manager 170 sends a response to the authorization request to access gateway 160, the response indicating the result of authorization (success or failure) and the attributes (columns 313-316 in row 322) associated with the user.

At 346, access gateway 160 sends an access denied response to the user request if the result of authorization indicates failure. On the other hand if the result of authorization is a success, at 347, access gateway 160 forwards the user request (along with the attributes received from access manager 170 at 345) to host node (150-5) hosting the requested content item. At 348, host node 150-5 sends the content item to access gateway 160, and accordingly at 249, access gateway 160 provides the requested content item as a response to the user request.

Thus, access manager 270 provides attributes associated with users to host node 150-5. It may be appreciated that the attributes that are included by access manager 170 at 345, and these included attributes are not present in the user request received at 341. Accordingly, the included (internal) attributes are deemed to be originating at access manager 170.

As noted above, the attributes provided by access manager 170 to host node 150-5 forms the basis for providing access to the requested content item. The manner in which host node 150-5 may be implemented to provide user access of hosted content items is described below with examples.

6. Example Implementation

Figure 4A:
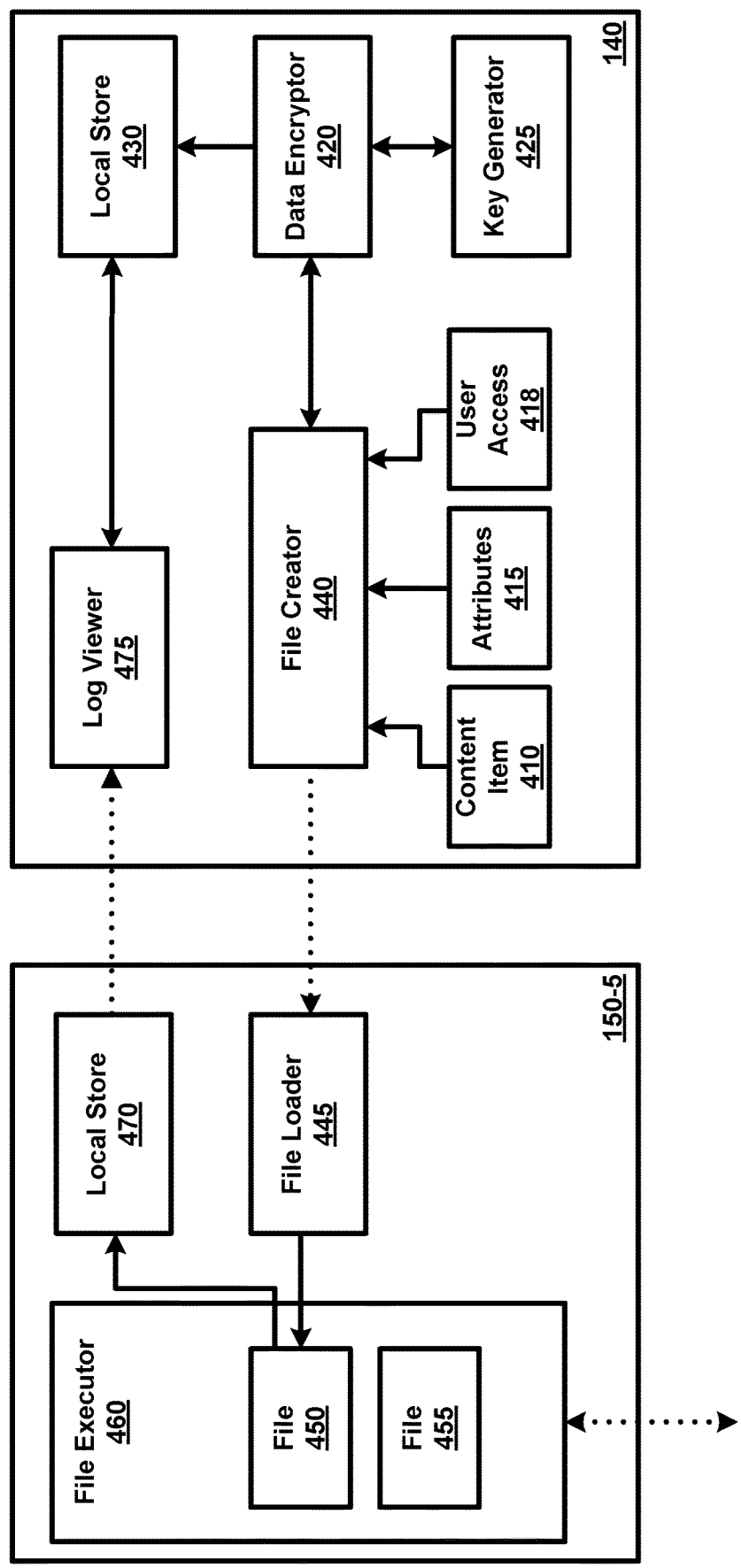
FIG. 4A depicts an example implementation providing control to tenants over user access of content hosted in cloud infrastructures.

FIG. 4A depicts an example implementation providing control to tenants over user access of content hosted in cloud infrastructures. Customer system 140 is shown containing content item 410, attributes 415, user access 418, data encryptor 420, key generator 425, local store 430, file creator 440 and log viewer 475, while host node 150-5 is shown containing file loader 445, files 450 and 455, file executor 460 and local store 470. Each of the blocks is described in detail below.

Content item 410 represents an application/data service or a data portion sought to be hosted in host node 150-5. Attributes 415 are associated with content item 410 and are received from a tenant/customer. User access 418 specifies an access criteria associated with content item 410 and is also received from the tenant. The tenant may specify desired attributes and access criteria using appropriate user interfaces (not shown) provided by customer system 140.

It may be appreciated that the tenant may associate any desired set of attributes (415) and corresponding values with content item. For example, attributes 415 may include attribute "Job Title" with value "Auditor", "Department" with value "Finance" and "Time of Day" with value "Work Hours". As such, only the users whose corresponding attributes matches the three attributes specified in 415 are allowed/permitted access to content item 410. It may be readily appreciated that for a received user request, the value of "Time of Day" may be received as part of the user request, while the values for attributes "Job Title" and "Department" for the user are originating at access manager 170 (in accordance with the operation of FIG. 3B).

Access criteria, provided according to an aspect of the present disclosure, specify the users permitted/allowed to access the content item. Access criteria may be in the form of a list of users allowed access, or as a set of conditions that are to be satisfied by the user. Access criteria are specified in addition to the attributes (415) based access noted above, for example, to check specific conditions associated with the attributes and/or specify conditions that cannot be specified/covered by the attributes. For example, when the attribute time of day is specified (e.g. during work hours), an access criteria may be specified to additionally check whether the number of times the content items is accessed in the time of day is within a desired count (e.g., 5).

Key generator 425 generates a pair of encryption and decryption keys, such that information (e.g. content item) encoded with the encryption key can be decoded into the original information using only the decryption key. In one embodiment, key generator 425 generates the pair of keys according to attribute based encryption (ABE), well known in the arts.

Data encryptor 420 performs the conversion of information based on an encryption key. Specifically, data encryption 420 converts an (original) content item into content item in encrypted form. In one embodiment, data encryptor 420 performs the conversion according to ABE.

Each of local stores 430 and 470 represents a persistent storage (such as a hard disk) used by other components (e.g., data encryptor 420, log viewer 475, file 450) to store data/information. The stored data/information may be later retrieved by the same or other components of customer system 140/host node 150-5. Log viewer 475 facilitates a tenant to view portions of an audit log specifying the details of access of content item 410.

File creator 440 creates a file suitable for hosting on host node 150-5. The created file includes the content item in encrypted form and associated desired set of attributes (415). According to an aspect, file creator 440 creates a single file (450) containing a content item and further controlling access to the contained content item. In other words, the single file performs the actions of determining, checking, decrypting and providing (250 through 280) of FIG. 2. In one embodiment, the single file is a Java Archive (JAR) file.

Figure 4B:
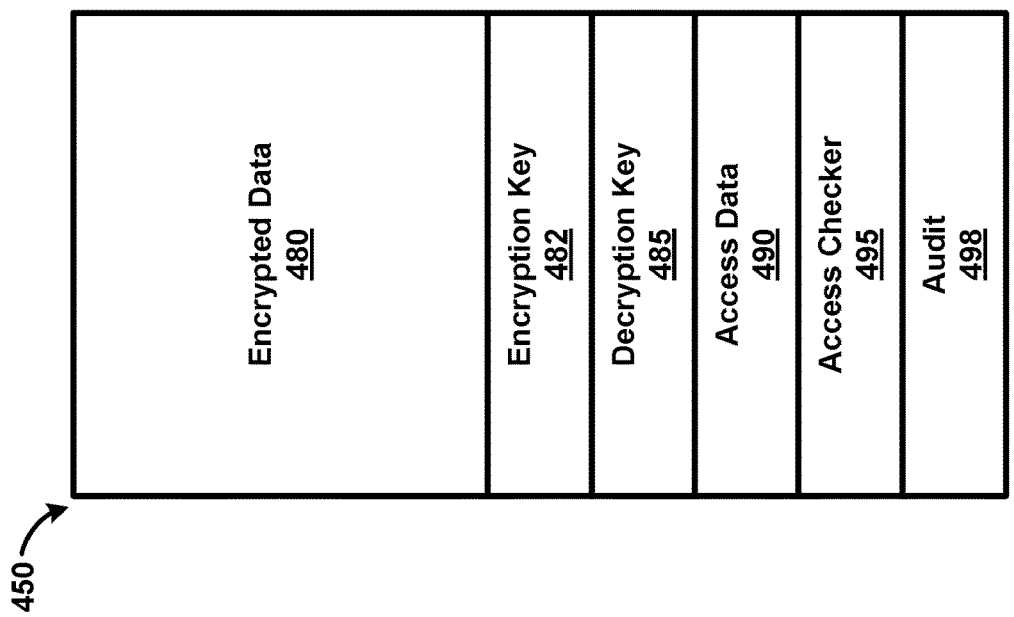
FIG. 4B depicts an example implementation of (such) a single file containing a content item and also controlling access to the contained content item.

FIG. 4B depicts an example implementation of (such) a single file containing a content item and also controlling access to the contained content item. File 450 is shown including encrypted data 480, encryption key 482, decryption key 485, access data 490, access checker module 495 and audit module 498.

Encrypted data 480 represents the content item in encrypted form. Encryption key 482 is the key used to perform the encryption/conversion of the content item, while decryption key 485 is the complementary key required to perform decryption/conversion of encrypted data 480 to obtain the original content item ("decrypted form"). Encryption key 482 and decryption key 485 is a pair of keys generated according to ABE. The keys are included in an 'obfuscated form', making it difficult for users to extract the keys from file 450.

Access data 490 specifies the access criteria/user list specifying users permitted to access the content item, with access checker module 495 performing the checking of whether a user (requesting access to the content item) satisfies the access criteria specified in access data 490.

Audit module 498 generates an audit log specifying the details of access of the content item. Audit module 498 also encrypts the audit log using encryption key 482 to create an audit log in encrypted form and stores the audit log in the encrypted form. It may be appreciated that storing in encrypted form ensures that the audit log is accessible only by the tenant (as only the tenant has access to the complementary decryption key). In addition, the storing in encrypted form ensures that the audit logs cannot be tampered by third parties.

Referring again to FIG. 4A, file creator 440 creates single file 450 suitable for hosting on host node 150-5, and then sends file 450 to host node 150-5 (in particular file loader 445) via access gateway 160 (as described above with respect to FIG. 1B). File loader 445 loads file 450 into file executor 460, such that file 450 is ready for execution when a user request for accessing the content item is received.

File executor 460 provides an execution environment (virtual machine) for the execution of files such as 450 and 455. Upon receiving user requests from user systems 110 via access gateway 160 (as described above with respect to FIG. 1B), file executor 460 loads the corresponding files containing the requested content items into volatile memory and then starts execution of the instructions contained in the files.

In the scenario where files 450 and 455 are JAR files, file executor 460 is a Java Virtual Machine (JVM) that loads and executes such JAR files. File loader 445 stores the JAR files such as file 450 at a specific location and adds the directory path of the location to the "CLASSPATH" system variable so as to enable the JVM to find and load the JAR files when corresponding user requests are received.

The manner in which the components of FIGS. 4A and 4B interact to provide control to a tenant over user access of content items hosted in host node 150-5 of cloud infrastructure 130 is described below with examples.

7. Example Interactions

FIG. 5A is a sequence diagram illustrating the interaction of various components to support a tenant hosting a content item in one embodiment. At 511, file creator 440 (in customer system 140) receives content item 410, associated attributes 415 and associated user access (criteria) 418 from a tenant. At 512A, file creator 440 sends content item 410 and attributes 415 to data encryptor 420. At 513A, data encryptor 420 sends attributes 415 to key generator 425 along with a request to generate a pair of encryption and decryption keys according to ABE and using attributes 415 as dependent attributes of the pair of keys. At 513B, data encryptor 420 receives the pair of keys from key generator 425.

At 514, data encryptor 420 performs the encryption of content item 410 to generate a content item in encrypted form using the encryption key received from key generator 425. At 515, data encryptor 420 stores the pair of keys in local store 430 (for later usage by log viewer 475), and then sends the content item in encrypted form along with the pair of keys to file creator 440 at 512B.

At 516, file creator 440 creates a single file 450 containing the content item in encrypted form (as encrypted data 480), encryption key (as 482), decryption key (as 484), user access 418 (as access data 490) and also instructions forming an access checker module (495) and an audit module (498). At 517, file creator 440 sends the single file 450 to file loader 445 (contained in host node 150-5) via access gateway 160 (as described above with respect to FIG. 1B). At 518, file creator 440 displays the status of creating and sending single file to the tenant using appropriate user interfaces.

Thus, a tenant hosts a content item in encrypted from in a node (150-5) of cloud infrastructure 130. The manner in which a user accesses the hosted content item is described in detail below.

FIG. 5B is a sequence diagram illustrating the interaction of various components to support a user access of a hosted content item in one embodiment. At 531, file executor 460 receives a user request to access a hosted content item, the user request including attributes originating at access manager 170 (in accordance with the operation of FIG. 3B). File executor 460 determines that the requested content item is contained in file 450. At 532, file executor 460 loads file 450 into volatile memory and starts execution of the instructions contained in file 450. Upon execution, file 450 creates a portion of the audit log indicating the details of the received user request, encrypts the audit log portion using encryption key 482. At 533, file 450 stores the encrypted audit log portion in local store 470.

At 534, file 450 determines a specific set of attributes associated with the user request. File 450 then checks whether the determined attributes match the attributes specified for the content item in encrypted form (480) and if the attributes match, decrypts encrypted data 480 using decryption key 485 to get (original) content item 410. As noted above, the match of the attributes is enforced by the ABE as part of decrypting. At 532B, file 450 sends content item 410 to file executor 440, which in turn provides access to content item 410 (as a response to user requests) at 535.

Thus, a user accesses a content item hosted in a node (150-5) of cloud infrastructure 130. It should be noted that the user is unaware that the content item is being hosted in an encrypted form and that the encrypted form is being converted to original/decrypted form prior to providing access.

According to an aspect of the present disclosure, host node 150-5 also generates an audit log specifying the details of access of the content item. The audit log is made of the audit log portions generated and stored at 533. The manner in which a tenant may view such an audit log is described in detail below.

Figure 5C:
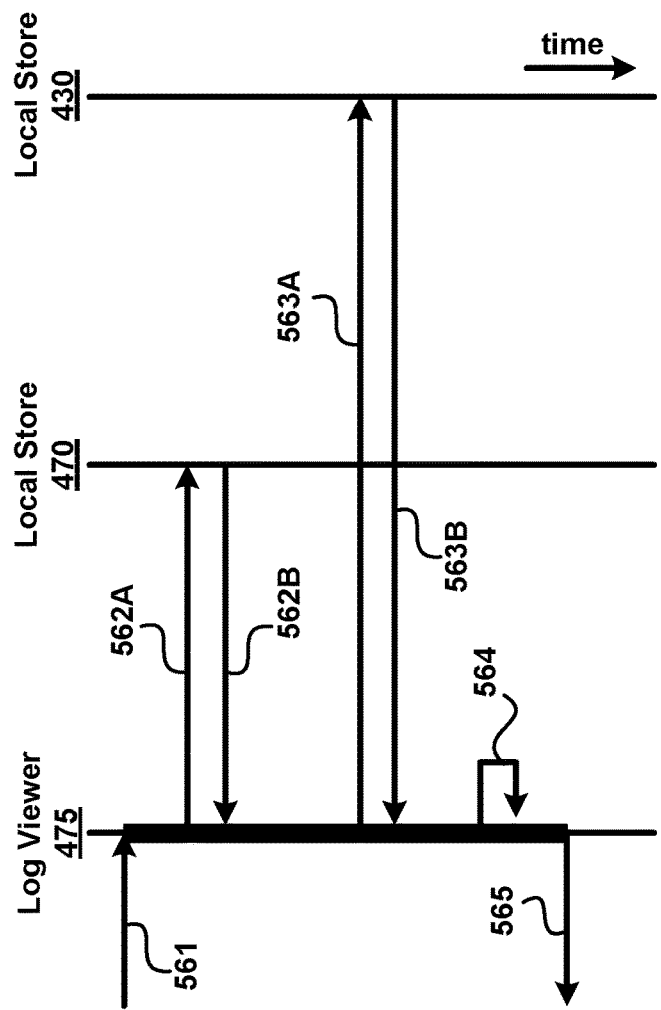
FIG. 5C is a sequence diagram illustrating the interaction of various components to support a tenant to view an audit log specifying the details of access of a content item in one embodiment.

FIG. 5C is a sequence diagram illustrating the interaction of various components to support a tenant to view an audit log specifying the details of access of a content item in one embodiment. At 561, log viewer 475 receives an indication from a tenant to view portions of the audit log for content item 410. The indication may be received from a user interface provided by log viewer 475. At 562A, log viewer 475 sends a request to local store 470 (in host node 150-5) for retrieving the audit log for content item 410. At 562B, log viewer 475 receives a response to the request, the response containing the requested audit log for content item 410. It should be noted that the received audit log for content item 410 is in encrypted form, with the encryption having been performed using encryption key 482.

At 563A, log viewer 475 finds the pair of keys associated with content item 410 in local store 430 (the keys having been earlier stored by data encryptor 420 during encryption of content item 410). At 563B, log viewer 475 retrieves the pair of keys (482 and 485) for content item 410 from local store 430. At 564, log viewer 475 performs the decryption of the received encrypted audit log to generate the original audit log. At 565, log viewer 475 provides (e.g., displays on a display unit) the original audit log to the tenant as a response to the indication received at 561. A tenant may then browse the audit log to identify unauthorized access of content item 410.

Thus, host node 150-5 provides control to tenants over user access of content hosted in the node. Though described above with respect to host node 150-5, the features of the present disclosure may be implemented in any one of nodes 150 as will be apparent to one skilled in the relevant arts by reading the disclosure herein.

It should be appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 6:
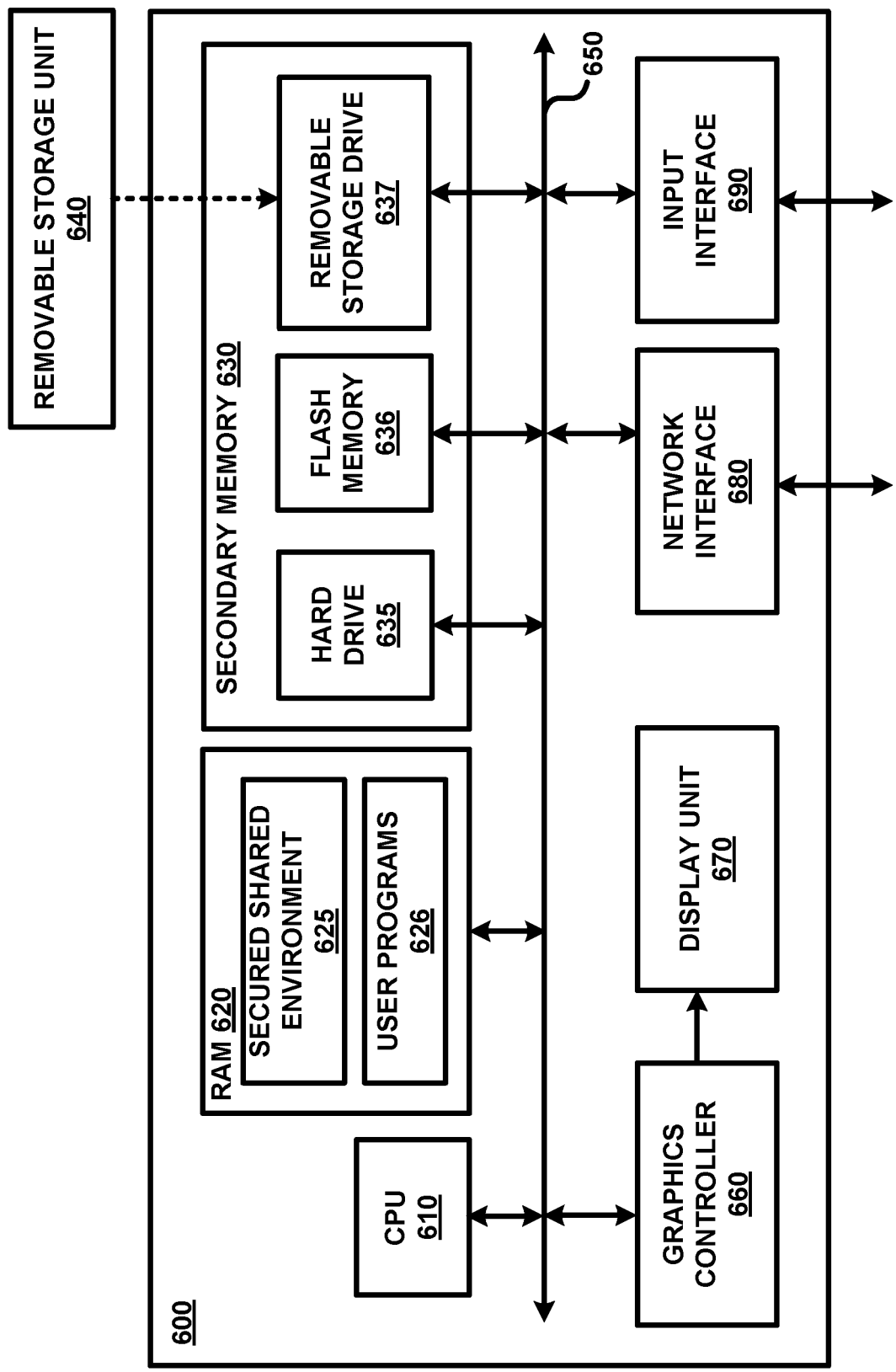
FIG. 6 is a block diagram illustrating the details of digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may correspond to any of nodes 150 in cloud infrastructure 130.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (of FIG. 1) connected to the networks (120).

Secondary memory 630 may contain hard drive 635, flash memory 636, and removable storage drive 637. Secondary memory 630 may store the data (for example, data portions shown in FIG. 3A, portions of file shown in FIG. 4B) and software instructions (for example, for implementing the various features of the present disclosure as shown in FIG. 2, sequence diagrams of FIG. 3A, FIGS. 5A-5C, etc.), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method performed in a host node of a cloud infrastructure, said method comprising:
    accepting a content item in encrypted form and a respective value of each attribute of an associated first set of attributes for controlling access to said content item;
    hosting said content item in said encrypted form in said cloud infrastructure;
    receiving a request from a user to access said content item hosted in said cloud infrastructure;
    determining a respective value of each attribute of a second set of attributes associated with said request, a second value of a second attribute of said second set of attributes originating at another node of said cloud infrastructure, wherein said another node implements one or more access policies controlling access of said content item hosted in said cloud infrastructure;
    if respective values, including said second value, of said second set of attributes match corresponding values of said first set of attributes:
        decrypting said content item in said encrypted form to generate said content item in decrypted form; and
        providing access to said content item in said decrypted form to said user as a response to said request.

2. The method of claim 1, wherein said determining, said decrypting and said providing are performed automatically, without requiring human intervention between said receiving and said providing, in response to said request.

3. The method of claim 2, wherein said content item and said respective value of each attribute of said first set of attributes is accepted from a tenant,
    wherein said tenant also provides an access criteria qualifying the access to said content item,
    said method further comprising checking in response to said request, whether said user satisfies said access criteria,
    wherein said decrypting and said providing are performed if said user is determined to satisfy said access criteria and respective values, including said second value, of said second set of attributes match corresponding values of said first set of attributes.

4. The method of claim 3, wherein said another node of said cloud infrastructure comprises an access manager,
    wherein said second value of said second attribute of said second set of attributes originates at said access manager, and wherein said host node receives said second value of said second attribute of said second set of attributes from said access manager.

5. The method of claim 4, wherein said second value of said second attribute is internally maintained by said tenant for said user in said access manager.

6. The method of claim 4, wherein said tenant provides the respective value of each attribute of said first set of attributes as dependent attributes of a decryption key according to attribute based encryption (ABE),
wherein said decrypting is performed using said decryption key according to said ABE, wherein the match of respective values, including said second value, of said second set of attributes with corresponding values of said first set of attributes is enforced by said ABE prior to said decrypting.

7. The method of claim 6, further comprising:
generating an audit log specifying the details of access of said content item;
encrypting said audit log using an encryption key according to said ABE to create said audit log in encrypted form; and
storing said audit log in said encrypted form to be thereafter accessible only by said tenant.

8. The method of claim 7, wherein an access checker module performs said checking, wherein an audit module performs said generating said audit log, said encrypting and said storing,
wherein said content item in said encrypted form, said access criteria, said decryption key, said encryption key, said access checker module and said audit module are together provided in a single file by said tenant.

9. The method of claim 8, wherein said single file is a Java Archive (JAR) file.

10. A non-transitory machine readable medium storing one or more sequences of instructions which upon execution by one or more processors contained in a host node of a cloud infrastructure causes said host node to perform actions of:
accepting a content item in encrypted form and a respective value of each attribute of an associated first set of attributes for controlling access to said content item;
hosting said content item in said encrypted form in said cloud infrastructure;
receiving a request from a user to access said content item hosted in said cloud infrastructure;
determining a respective value of each attribute of a second set of attributes associated with said request, a second value of a second attribute of said second set of attributes originating at another node of said cloud infrastructure, wherein said another node implements one or more access policies controlling access of said content item hosted in said cloud infrastructure;
if respective values, including said second value, of said second set of attributes match corresponding values of said first set of attributes:
decrypting said content item in said encrypted form to generate said content item in decrypted form; and
providing access to said content item in said decrypted form to said user as a response to said request.

11. The non-transitory machine readable medium of claim 10, wherein said determining, said decrypting and said providing are performed automatically, without requiring human intervention between said receiving and said providing, in response to said request.

12. The non-transitory machine readable medium of claim 11, wherein said content item and said respective value of each attribute of said first set of attributes is accepted from a tenant,
wherein said tenant also provides an access criteria qualifying the access to said content item,
further comprising one or more instructions for checking in response to said request, whether said user satisfies said access criteria,
wherein said decrypting and said providing are performed if said user is determined to satisfy said access criteria and respective values, including said second value, of said second set of attributes match corresponding values of said first set of attributes.

13. The non-transitory machine readable medium of claim 12, wherein said another node of said cloud infrastructure comprises an access manager,
wherein said second value of said second attribute of said second set of attributes originates at said access manager, and
wherein said host node receives said second value of said second attribute of said second set of attributes from said access manager.

14. The non-transitory machine readable medium of claim 13, wherein said second value of said second attribute is internally maintained by said tenant for said user in said access manager.

15. The non-transitory machine readable medium of claim 13, wherein said tenant provides the respective value of each attribute of said first set of attributes as dependent attributes of a decryption key according to attribute based encryption (ABE),
wherein said decrypting is performed using said decryption key according to said ABE, wherein the match of respective values, including said second value, of said second set of attributes with corresponding values of said first set of attributes is enforced by said ABE prior to said decrypting.

16. The non-transitory machine readable medium of claim 15, further comprising one or more instructions for:
generating an audit log specifying the details of access of said content item;
encrypting said audit log using an encryption key according to said ABE to create said audit log in encrypted form; and
storing said audit log in said encrypted form to be thereafter accessible only by said tenant.

17. A digital processing system comprising:
a random access memory (RAM) to store instructions; and
one or more processors to retrieve and execute said instructions, wherein execution of said instructions causes said digital processing system to perform actions of:
accepting a content item in encrypted form and a respective value of each attribute of an associated first set of attributes for controlling access to said content item;
hosting said content item in said encrypted form in said cloud infrastructure;
receiving a request from a user to access said content item hosted in said cloud infrastructure;
determining a respective value of each attribute of a second set of attributes associated with said request, a second value of a second attribute of said second set of attributes originating at another system, wherein said another node implements one or more access policies controlling access of said content item hosted in said cloud infrastructure;

if respective values, including said second value, of said second set of attributes match corresponding values of said first set of attributes:

decrypting said content item in said encrypted form to generate said content item in decrypted form; and providing access to said content item in said decrypted form to said user as a response to said request.

18. The digital processing system of claim 17, wherein said determining, said decrypting and said providing are performed automatically, without requiring human intervention between said receiving and said providing, in response to said request.

19. The digital processing system of claim 18, wherein said content item and said respective value of each attribute of said first set of attributes is accepted from a tenant, wherein said tenant also provides an access criteria qualifying the access to said content item, said digital processing system performing further actions of checking in response to said request, whether said user satisfies said access criteria, wherein said decrypting and said providing are performed if said user is determined to satisfy said access criteria and respective values, including said second value, of said second set of attributes match corresponding values of said first set of attributes.

20. The digital processing system of claim 19, wherein said digital processing system comprises a host node in a cloud infrastructure, wherein said another system comprises an access manager, wherein said second value of said second attribute of said second set of attributes originates at said access manager, and wherein said host node receives said second value of said second attribute of said second set of attributes from said access manager, wherein said tenant provides the respective value of each attribute of said first set of attributes as dependent attributes of a decryption key according to attribute based encryption (ABE), wherein said decrypting is performed using said decryption key according to said ABE, wherein the match of respective values, including said second value, of said second set of attributes with corresponding values of said first set of attributes is enforced by said ABE prior to said decrypting.

* * * * *